United States Patent

Goto et al.

[11] Patent Number: 5,917,010
[45] Date of Patent: Jun. 29, 1999

[54] PREPARATION PROCESS OF ALIPHATIC POLYESTER

[75] Inventors: Kenichi Goto; Yukiko Mori; Michihiko Miyamoto, all of Fukuoka-ken, Japan

[73] Assignee: Mitsui Chemicals, Inc., Tokyo, Japan

[21] Appl. No.: 08/917,378

[22] Filed: Aug. 26, 1997

[30] Foreign Application Priority Data

Sep. 2, 1996 [JP] Japan ................................ 8-231714

[51] Int. Cl.$^6$ ................................ C08F 6/00; B01J 49/00
[52] U.S. Cl. ................................ 528/491; 528/274; 528/275; 528/302; 528/361; 528/487; 528/488; 525/437; 525/444; 524/700; 524/742; 524/755; 210/660; 210/661; 210/670
[58] Field of Search ................................ 528/274, 275, 528/302, 361, 487, 488, 491; 525/437, 444; 524/700, 742, 755; 210/660, 661, 670

[56] References Cited

U.S. PATENT DOCUMENTS 5,310,865  5/1994  Enomoto et al. .................... 528/361
5,401,796  3/1995  Kashima et al. .................... 524/706
5,428,126  6/1995  Kashima et al. .................... 528/490
5,637,631  6/1997  Kitada et al. ...................... 524/81
5,714,230  2/1998  Kameoka et al. ................... 428/141

Primary Examiner—Samuel A. Acquah
Attorney, Agent, or Firm—Burns, Doane, Swecker & Mathis, L.L.P.

[57] ABSTRACT

The invention relates to a preparation process of aliphatic polyester, comprising using an ion exchange resin as a drying agent and after the dehydration polycondensation reaction, regenerating and drying the used ion exchange resin and repeatedly using said ion exchange resin in the next dehydration polycondensation reaction, in a process for preparing aliphatic polyester from one or more aliphatic compound (A) by heating in an organic solvent in the presence of a catalyst, distilling a generated water containing organic solvent out of the reaction system, treating the distilled organic solvent with a drying agent, and returning the treated solvent to the reaction system to progress a dehydration polycondensation reaction. The process of the invention enables one to steadily and efficiently prepare in industry an aliphatic polyester having an excellent color tone, high molecular weight and high quality.

18 Claims, 1 Drawing Sheet

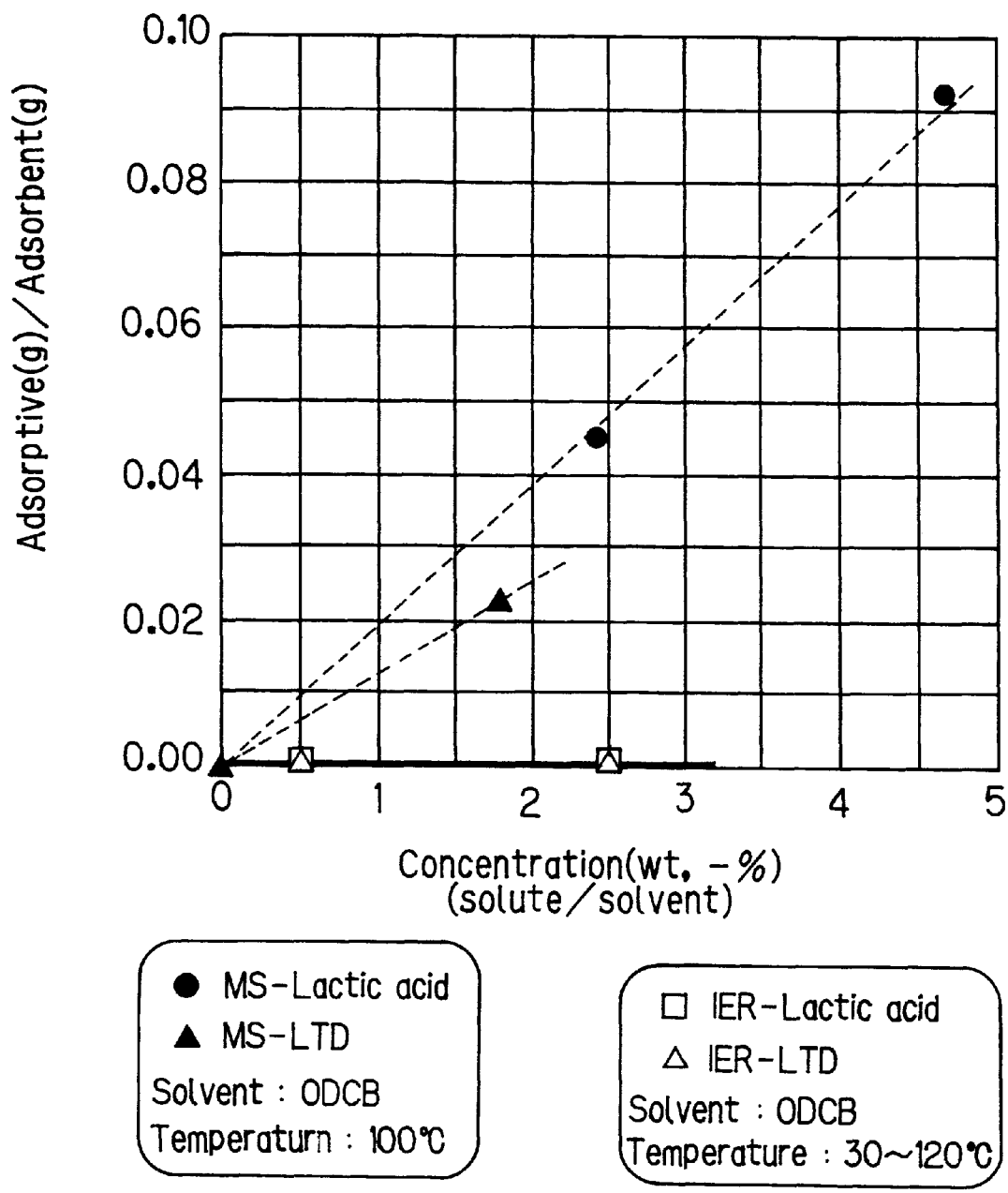

PREPARATION PROCESS OF ALIPHATIC POLYESTER

BACKGROUND OF THE INVENTION

1. Field of the Invention

The present invention relates to a preparation process of aliphatic polyester which is a useful biodegradable polymer as a substitute of medical materials and general purpose resins, by direct-dehydration polycondensation.

2. Description of the Related Art

A biodegradable polymer of aliphatic polyester, particularly aliphatic polyester which is represented by polylactic acid and can be prepared from an aliphatic hydroxycarboxylic acid having a carboxyl group and hydroxyl group in the same molecule (hereinafter referred to as polyhydroxycarboxylic acid) is excellent in mechanical, physical, and chemical properties, also has a biodegradable property and can be degraded in the natural environment without causing pollution finally to water and carbon dioxide by the action of microorganisms. Consequently, biodegradable aliphatic polyester has recently has focused attention as a medical material and a replacement for general purpose resins in view of environmental protection and in other various fields of use, and is now expected to have a large expansion of demand in future.

It has been known in the preparation process of aliphatic polyhydroxycarboxylic acid that a high molecular weight polymer can be usually obtained in the case of lactic acid and glycolic acid by dimerizing aliphatic hydroxycarboxylic acid through dehydration and successively subjecting the resulting cyclic dimer to ring-opening melt polymerization in the presence of various catalysts. The process requires much labor and cost for preparing the cyclic dimer, lactic or glycolide, and is thus unfavorable in economy. Further, some kinds of aliphatic hydroxycarboxylic acid do not form a cyclic dimer and the process cannot be used in such cases.

On the other hand, several processes for preparing aliphatic polyhydroxycarboxylic acid by direct dehydration process from aliphatic hydroxycarboxylic acid or an oligomer of the same have been disclosed (Japanese Laid-Open Patent SHO 59-096123 and 61-028521). However, the polymer obtained by these processes has an upper limit of inherent viscosity at around 0.3 dl/g, does not have satisfactory mechanical properties, and cannot be applied to some uses and objects. Consequently, the preparation process of aliphatic-polyhydroxycarboxylic acid having sufficient mechanical properties is restricted to the ring-opening melt polymerization process of cyclic dimer and the composition of the resulting polymer is also limited in the present state of the art.

The direct polymerization of lactic acid, glycolic acid and other aliphatic hydroxycarboxylic acid is a successive reaction similar to an esterification reaction of dibasic acid and aliphatic polyhydric alcohol. The molecular weight of the resulting polymer increases with the reaction time. The water molecule generated in the reaction has an action for decreasing the molecular weight of the polycondensate by an reverse reaction due to hydrolysis action. As a result, it has been required in order to obtain a high molecular weight polymer to efficiently remove the generated water from the reaction system. Methods which can be used for removing water include increasing the stirring velocity in the reaction, enhancing the extent of reduced pressure, and introduction of an inert gas into the reaction system in order to evaporate water. However, these methods are restricted because the viscosity of the reaction system remarkably increases with increase in the molecular weight.

The preparation process of a high molecular weight polyester from an aliphatic polyhydric alcohol having two or more hydroxyl groups and an aliphatic polybasic acid having two or more carboxylic groups is, as well known in the art, on the basis of the deglycolation reaction of low molecular weight polyester having terminal hydroxyl group. Consequently, the concentration of the terminal group remarkably decreases with increase in the molecular weight and leads to limit the molecular weight. The tendency is markedly found on aliphatic polyester in particular.

For example, in the preparation of high molecular weight aliphatic polyester by conventional deglycolation reaction under reduced pressure, it is observed that the molecular weight once reaches a maximum and then turns into reduction. Conventional deglycolation reaction has been difficult to provide aliphatic polyester having a molecular weight sufficient to form a tough film. In other words, aliphatic polyester obtained by the process could not provide a film having practical utility.

As to a process for preparing aliphatic polyhydroxycarboxylic acid and other aliphatic polyester, efficiently in industry, with ease and at a low cost, U.S. Pat. No. 5,310,865 has disclosed a process for preparing high molecular weight aliphatic polyhydroxycarboxylic acid by heating aliphatic hydroxycarboxylic acid in an organic solvent in the presence of a catalyst, treating the distilled solvent with a drying agent and returning the treated solvent to the reaction system. Further, U.S. Pat. No. 5,401,796 has disclosed a process for preparing high molecular weight aliphatic polyester by heating aliphatic polyhydric alcohol and aliphatic polybasic acid in an organic solvent to progress a dehydration polycondensation reaction, distilling out generated water together with the organic solvent, making the distilled solvent into contact with a drying agent, and returning dehydrated solvent to the reaction system.

In these preparation processes, the removing method of generated water which is an important factor for the progress of the dehydration polycondensation reaction has adopted a system for distilling water-containing solvent under reflux, treating the distilled solvent with a drying agent, and returning again the dehydrated solvent to the reaction system.

However, in order to prepare aliphatic polyhydroxycarboxylic acid in industry, further improvement has been required for the step of removing the generated water. When using a drying agent such diphosphorus pentoxide; calcium hydride, sodium hydride, lithium aluminum hydride and other metal hydrides and sodium, lithium and other alkali metals, the drying agent which reacts with moisture requires labor for reactivation and is not adequate for practical use. On the other hand, the drying agent which adsorbs moisture is ease in handling, can be reactivated, and thus is adequate for practical use. However, molecular sieve adsorbs organic compounds. A solvent which evaporates in the course of the polymerization reaction contains other associately evaporated compounds such as aliphatic hydroxycarboxylic acid, lactide, glycolide and other cyclic dimer which are derived from aliphatic hydroxycarboxylic acid, aliphatic polyhydric alcohol, aliphatic polybasic acid and an oligomer of the same. When molecular sieve is used as the drying agent, these compounds are adsorbed to molecular sieve.

Further, the regeneration temperature of molecular sieve is 200–300° C. Thus, absorbed compounds to molecular sieve are modified and deteriorated. As a result, repeated use of the drying agent contaminates modified ingredients into the polymerization system and has impaired product quality, color tone in particular.

SUMMARY OF THE INVENTION

As a result of an intensive investigation in order to overcome these problems and to improve the process so as to more efficiently prepare aliphatic polyhydroxycarboxylic acid and other aliphatic polyester, the present inventors have found that use of an exchange resin as a drying agent is effective for treating the water-containing solvent which distills under reflux from the reaction system.

FIG. 1 illustrates adsorption equilibrium of lactic acid and lactide on molecular sieve and the cation exchange resin. It has been quite surprisingly found that, contrary to molecular sieve, the cation exchange resin does not adsorb lactic acid and lactide at all independently upon the concentration in the solvent. That is, use of the ion exchange resin as the drying agent in the reaction inhibits adsorption of aliphatic hydroxycarboxylic acid and other related compounds which associate with the evaporating solvent. Further, the ion exchange resin can be regenerated at relatively decreased temperature of 100–140° C. which is almost equal to the reaction temperature and thus can prevent adsorbed compound from modification in the repeated use of the drying agent. Thus, efficient removal of generated water and repeated use of the drying agent which are an important factor in the direct dehydration polymerization process can be carried out without giving an adverse effect on the quality of the product.

That is, the present invention includes the following subjects.

1) In a process for preparing aliphatic polyester from one or more aliphatic compound (A) selected from the group consisting of;

(a1) an aliphatic hydroxycarboxylic acid,
(a2) a polymer of an aliphatic hydroxycarboxylic acid,
(a3) an aliphatic polycarboxylic acid and an aliphatic polyhydric alcohol, and
(a4) a polymer of an aliphatic polycarboxylic acid and aliphatic polyhydric alcohol, by heating in an organic solvent in the presence of a catalyst, distilling a generated water containing organic solvent out of the reaction system, treating the distilled organic solvent with a drying agent, and returning the treated solvent to the reaction system to progress a dehydration polycondensation reaction, a preparation process of aliphatic polyester, comprising using an ion exchange resin as a drying agent and after the dehydration polycondensation reaction, regenerating and drying the used ion exchange resin and repeatedly using said ion exchange resin in the next dehydration polycondensation reaction.

2) The preparation process of aliphatic polyester according to 1), wherein the ion exchange resin used is a strongly acidic ion exchange resin containing an exchanger of sulfonic acid group with a sodium ion as a counter ion.

3) The preparation process of aliphatic polyester according to 1) or 2), wherein the aliphatic compound (A) is (a1) an aliphatic hydroxycarboxylic acid and/or (a2) a polymer of an aliphatic hydroxycarboxylic acid.

4) The preparation process of aliphatic polyester according to 3), wherein the aliphatic hydroxycarboxylic acid is lactic acid.

5) The preparation process of aliphatic polyester according to 1) or 2), wherein the aliphatic compound (A) is (a3) an aliphatic polycarboxylic acid and aliphatic polyhydric alcohol and/or (a4) a polymer of an aliphatic polycarboxylic acid and an aliphatic polyhydric alcohol.

6) The preparation process of aliphatic polyester according to 5), wherein the aliphatic polycarboxylic acid is succinic acid and the aliphatic polyhydric alcohol is 1,4-butanediol.

7) The preparation process of aliphatic polyester according to 1) or 2), wherein the aliphatic compound (A) is a mixture of (a1) an aliphatic hydroxycarboxylic acid and (a3) an aliphatic polycarboxylic acid and an aliphatic polyhydric alcohol.

8) The preparation process of aliphatic polyester according to 7), wherein the aliphatic hydroxycarboxylic acid is lactic acid, the aliphatic polycarboxylic acid is succinic acid and the aliphatic polyhydric alcohol is 1,4-butanediol.

9) The preparation process of aliphatic polyester according to 1) or 2), wherein the aliphatic compound (A) is a mixture of (a2) a polymer of an aliphatic hydroxycarboxylic acid and (a4) a polymer of an aliphatic polycarboxylic acid and an aliphatic polyhydric alcohol.

10) The preparation process of aliphatic polyester according to 9), wherein the aliphatic hydroxycarboxylic acid is lactic acid, the aliphatic polycarboxylic acid is succinic acid and the aliphatic polyhydric alcohol is 1,4-butanediol.

Repeated use of an ion exchange resin as a drying agent in the invention gives the following effect;

1) carrying out efficient removal of generated water,
2) preparing a product having a excellent color tone which can not be prepared by other drying agent, and
3) providing a industrial process for preparing an aliphatic polyester.

BRIEF DESCRIPTION OF THE DRAWING

FIG. 1 illustrates adsorption equilibrium of lactic acid and lactide on molecular sieve and ion exchange resin.

FIG. 1 illustrates that lactic acid and lactide (LTD) are absorbed on molecular sieve but are not adsorbed on strongly acidic ion exchange resin containing an exchanger of sulfonic acid group with a sodium ion as a counter ion.

BRIEF DESCRIPTION OF THE DRAWING

The present invention will hereinafter be described in detail.

Representative examples of aliphatic hydroxycarboxylic acid which can be used in the invention include, for example, glycolic acid, lactic acid, 2-hydroxybutanoic acid, 2-hydroxypentanoic acid, 2-hydroxyhexanoic acid, 2-hydroxyheptanoic acid, 2-hydroxyoctanoic acid, 2-hydroxy-2-methylpropanoic acid, 2-hydroxy-2-methylbutanoic acid, 2-hydroxy-2-ethylbutanoic acid, 2-hydroxy-2-methylpentanoic acid, 2-hydroxy-2-ethylpentanoic acid, 2-hydroxy-2-propylpentanoic acid, 2-hydroxy-2-butylpentanoic acid, 2-hydroxy-2-methylhexanoic acid, 2-hydroxy-2-ethylhexanoic acid, 2-hydroxy-2-propylhexanoic acid, 2-hydroxy-2-butylhexanoic acid, 2-hydroxy-2-pentylhexanoic acid, 2-hydroxy-2-methylheptanoic acid, 2-hydroxy-2-ethylheptanoic acid, 2-hydroxy-2-propylheptanoic acid, 2-hydroxy-2-butylheptanoic acid, 2-hydroxy-2-pentylheptanoic acid, 2-hydroxy-2-hexylheptanoic acid, 2-hydroxy-2-methyloctanoic acid, 2-hydroxy-2-ethyloctanoic acid, 2-hydroxy-2-propyloctanoic acid, 2-hydroxy-2-butyloctanoic acid, 2-hydroxy-2-pentyloctanoic acid, 2-hydroxy-2-hexyloctanoic acid, 2-hydroxy-2-heptyloctanoic acid, 3-hydroxypropanoic acid, 3-hydroxybutanoic acid, 3-hydroxypentanoic acid, 3-hydroxyhexanoic acid, 3-hydroxyheptanoic acid, 3-hydroxyoctanoic acid, 3-hydroxy-3-methylbutanoic acid, 3-hydroxy-3-methylpentanoic acid, 3-hydroxy-3-methylheptanoic acid, 3-hydroxy-3-ethylpentanoic acid, 3-hydroxy-3-methylhexanoic acid, 3-hydroxy-3-ethylhexanoic acid, 3-hydroxy-3-propylhexanoic acid, 3-hydroxy-3-methylheptanoic acid, 3-hydroxy-3-ethylheptanoic acid, 3-hydroxy-3-propylheptanoic acid, 3-hydroxy-3-butylheptanoic acid, 3-hydroxy-3-methyloctanoic acid, 3-hydroxy-3-ethyloctanoic acid, 3-hydroxy-3-propyloctanoic acid, 3-hydroxy-3-butyloctanoic acid, 3-hydroxy-3-pentyloctanoic acid, 4-hydroxybutanoic acid, 4-hydroxypentanoic acid, 4-hydroxyhexanoic acid, 4-hydroxyheptanoic acid, 4-hydroxyoctanoic aicd, 4-hydroxy-4-methylpentanoic acid, 4-hydroxy-4-methylhexanoic acid, 4-hydroxy-4-ethylhexanoic acid, 4-hydroxy-4-methylheptanoic acid, 4-hydroxy-4-ethylheptanoic acid, 4-hydroxy-4-propylheptanoic acid, 4-hydroxy-4-methyloctanoic acid, 4-hydroxy-4-ethyloctanoic acid, 4-hydroxy-4-propyloctanoic acid, 4-hydroxy-4-butyloctanoic acid, 5-hydroxypentanoic acid, 5-hydroxyhexanoic acid, 5-hydroxyheptanoic acid, 5-hydroxyoctanoic acid, 5-hydroxy-5-methylhexanoic acid, 5-hydroxy-5-methylheptanoic acid, 5-hydroxy-5-ethylheptanoic acid, 5-hydroxy-5-methyloctanoic acid, 5-hydroxy-5-ethyloctanoic acid, 5-hydroxy-5-propyloctanoic acid, 6-hydroxyhexanoic acid, 6-hydroxyheptanoic acid, 6-hydroxyoctanoic acid, 6-hydroxy-6-methylheptanoic acid, 6-hydroxy-6-methyloctanoic acid, 6-hydroxy-6-ethyloctanoic acid, 7-hydroxyheptanoic acid, 7-hydroxyoctanoic acid, 7-hydroxy-7-methyloctanoic acid, 8-hydroxyoctanoic acid, and other aliphatic hydroxycarboxylic acids. These acids can be used singly or as a mixture. Aliphatic hydroxycarboxylic acids which can be preferably used in particular are lactic acid, glycolic acid, 3-hydroxybutyric acid, 4-hydroxybutyric acid, 3-hydroxyvaleric acid and a mixture of these acids.

Specific examples of aliphatic polycarboxylic acid which can be used in the invention include succinic acid, oxalic acid, malonic acid, glutaric acid, adipic acid, pimelic acid, suberic acid, azelaic acid, sebacic acid, undecanoic diacid, dodecanoic diacid, maleic acid and fumaric acid.

Exemplary aliphatic polyhydric alcohols which can be used in the invention include ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol, 1,4-cyclohexanedimethanol and other aliphatic diols; and trimethylolpropane, trimethylolethane, trimethylolheptane, 1,2,4-butanetriol, 1,2,6-hexanetriol and other aliphatic triols.

Polymers obtained by dehydration polycondensation of the above aliphatic hydroxycarboxylic acid and aliphatic polycarboxylic acid and aliphatic polyhydric alcohol can also be used as a raw material in the process of the invention. These polymers can include oligomers of the above aliphatic hydroxycarboxylic acid and aliphatic polycarboxylic acid and aliphatic polyhydric alcohol. These polymers can be used singly or as a mixture.

Some aliphatic hydroxycarboxylic acid and the polymer of the same have optically active carbon in the molecule and are distinguished in the form of a D-isomer, L-isomer and D/L-isomer, respectively. Any of these isomers can be used in the invention.

Exemplary catalysts which can be used in the invention are metals, metal salts, hydroxides and oxides in the group I, II, III, IV and V of the periodic table and include, for example, zinc, tin, aluminum, magnesium, antimony, titanium, zirconium and other metals; tin oxide, antimony oxide, lead oxide, aluminum oxide, magnesium oxide, titanium oxide and other metal oxides; zinc chloride, stannous chloride, stannic chloride, stannous bromide, stannic bromide, antimony fluoride, magnesium chloride, aluminum chloride and other metal halogenides; sodium hydroxide, potassium hydroxide, calcium hydroxide, magnesium hydroxide, aluminum hydroxide, zinc hydroxide, iron hydroxide, cobalt hydroxide, nickel hydroxide, copper hydroxide, cesium hydroxide, strontium hydroxide, barium hydroxide, lithium hydroxide, zirconium hydroxide and other metal hydroxides; tin sulfate, zinc sulfate, aluminum sulfate and other metal sulfates; magnesium carbonate, zinc carbonate, calcium carbonate and other metal carbonates; tin acetate, stannous octoate, tin lactate, zinc acetate, aluminum acetate, iron lactate and other organic carboxylate metal salts; and tin trifluoromethanesulfonate, tin p-toluenesulfonate and other organic sulfonate metal salts.

Other catalysts which can be used include, dibutyltin oxide and other organometal oxides of the above metals, titanium isopropoxide and other metal alkoxides of the above metals, diethylzinc and other alkyl metals of the above metals, and ion exchange resin. The amount of these catalysts are in the range of 0.0001–10% by weight for the above aliphatic hydroxycarboxylic acid, aliphatic polycarboxylic acid and aliphatic polyhydric alcohol or the polymer of the same.

The organic solvents which can be used in the invention include, for example, aromatic hydrocarbons, halogenated aromatic hydrocarbons, halogenated aliphatic hydrocarbons and ether-based hydrocarbons.

Representative aromatic hydrocarbons include toluene, xylene, ethylbenzene, diethylbenzene, isopropylbenzene, amylbenzene, dimethylbenzene and p-cymene.

Halogenated aromatic hydrocarbons include, for example, chlorobenzene, chlorobenzyl, o-chlorotoluene, m-, p-chlorotoluene, α-chloroethylbenzene, β-chloroethylbenzene, o-dichlorobenzene, m-dichlorobenzene, p-dichlorobenzene, 1,2,3-trichlorobenzene, 1,2,4-trichlorobenzene, 1,3,5-trichlorobenzene, bromobenzene, o-bromotoluene, m-bromotoluene, p-bromotoluene, α-bromoethylbenzene, β-bromoethylbenzene, o-dibromobenzene, m-dibromobenzene, p-dibromobenzene, 1-chloronaphthalene, 2-chloronaphthalene, 1-bromonaphthale, 2-bromonaphtalene, and 1-fluoronaphthalene.

Exemplary halogenated aliphatic hydrocarbons include trichloromethane, tetrachloromethane, 1,1-dichloroethane, 1,2-dichloroethane, 1,1,1-trichloroethane, 1,1,2-trichloroethane, 1,1,1-trichloroethylene, 1,1,1,2-tetrachloroethane, 1-chloropropane, 1-chlorobutane, 1,2-dichloropropane, 1,3-dichloropropane, 1,4-dichlorobutane, 1,2-dibromoethane, 1,1,1-tribromoethane, 1,1,2-tribromoethane, 1,1,1-tribromoethylene, 1,1,1,2-tetrabromoethane, 1-bromopropane, 1-bromobutane, 1,2-dibromopropane, 1,3-dibromopropane, and 1,4-dibromobutane.

Representative ether-based hydrocarbons include, for example, anisole, ethoxybenzene, o-cresyl methyl ether, m-cresyl methyl ether, p-cresyl methyl ether, 2-chloromethoxybenzene, 4-chloromethoxybenzene, dichloroethyl ether, diisopropyl ether, di-n-butyl ether and diisoamyl ether. These solvent can be used singly or as a mixture and no limitation is imposed upon these solvents.

The solvents are used in the range giving a polymer concentration of 3–80% by weight, preferably 5–50% by weight. When the polymer concentration is higher than 80% by weight, the viscosity of molten polymer solution becomes extremely high. As a result, stirring in the reaction, successive transfer of the reaction mass, and other handling and operations become difficult. On the other hand, when the polymer concentration is lower than 3% by weight, no problem takes place on the reaction and post treatment. However, volume efficiency is poor and productivity is disadvantageous.

The dehydration polycondensation reaction in the invention can be carried out in the atmospheric and under reduced pressure. The reaction temperature can be increased up to the reflux temperature of the solvent used, and is preferably 50–250° C., more preferably 100–170° C. When the reaction temperature is lower than 50° C., the efficiency for removing the generated water out of the reaction system by way of azeotropic distillation with a solvent becomes poor and reaction velocity decrease remarkably. On the other hand, when the reaction temperature is higher than 250° C., polymer is deteriorated, reaction mass is colored, and quality of the product is unfavorably impaired.

No particular restriction is imposed upon the equipment for carrying out dehydration polycondensation, so long as the equipment has a structure for removing the evaporated organic solvent from the reaction system together with generated water, applying dehydration treatment continuously or batchwise to the organic solvent with an ion exchange resin and successively returning the treated solvent to the reaction system.

The ion exchange resin which can be used for removing generated water in the process of the invention is arbitrarily selected from a cation exchange resin having sulfonic acid group or carboxylic acid group and anion exchange resin having trimethylammonium group, dimethylhydroxyethylammonium group or dimethylamino group as an exchanger. Particulary, the cation exchange resin containing a sulfonic acid group as an exchanger and having a sodium ion as a counter ion is excellent in dehydration capacity and thermal stability and is suitable for use in the process of the invention.

The dehydration treatment is conducted by packing an ion exchange resin in a column and passing the organic solvent upwardly or downwardly through the ion exchange resin layer or by mixing the organic solvent with the ion exchange resin in a vessel fitted with a stirrer. However, no particular restriction is put upon the treatment method so long as moisture can be removed from the organic solvent. Treatment temperature is suitably in the range of 10–50° C. Accordingly, the organic solvent to be treated must be previously cooled to this range of temperature. When temperature of the organic solvent is higher than the range, absorbed moisture on the ion exchange resin is liable to be desorbed and unfavorably results in reduction of moisture adsorption capacity.

The amount of the ion exchange resin is suitably 10–1000 times by weight as a dry resin for the amount of generated water which is distilled out of the reaction system from the initiation of dehydration by the ion exchange resin to the termination of polymerization reaction. Particularly in the case of dehydration treatment by using a stirrer in a fluid bed, the amount of dried ion exchange resin is preferably 500–1000 times by weight for the generated water. When the amount of the ion exchange resin is small, removal of the generated water becomes insufficient and the desired molecular weight cannot be attained due to molecular weight reduction by hydrolysis. When the ion exchange resin is in excess, no problem takes place on the preparation of the product having a desired molecular weight. However, there is a great disadvantage and poor efficiency in view of equipment scale required and energy and utility for regenerated the ion exchange resin.

The ion exchange resin can be regenerated by drying and reused many times for the drying agent of the organic solvent in the process of the invention. The regeneration drying can be carried out, in the state of packing the resin as intact in the column or in the state of placing the recovered resin in an drying oven, by ventilating nitrogen, air and other inert gases at 100–130° C. Exhaust gas and associated organic solvents can be condensed by cooling and reused as an organic solvent for the reaction. Accompanied by the removal of adsorbed water and adhered organic solvents to the ion exchange resin, the exhaust temperature gradually increases to around the drying temperature. The temperature increase terminates after complete removal of water and organic solvents and thus the end point of regeneration drying can be checked by the phenomenon.

The method used in the process of the invention for removing the generated water can be used, in addition to the preparation of aliphatic polyhydroxycarboxylic acid, for the preparation of aliphatic polyester by using aliphatic polycarboxylic acid and aliphatic polyhydric alcohol as raw materials, the preparation of a polyester copolymer consisting of aliphatic hydroxycarboxylic acid, aliphatic polycarboxylic acid and aliphatic polyhydric alcohol and other polymerization systems which progress polycondensation while directly removing the generated water; and can also be applied to other reaction systems which require strict removal of moisture in a solvent.

The process of the invention enables one to steadily and efficiently prepare in industry an aliphatic polyester having an excellent color tone, high molecular weight and high quality.

In the process of the invention, polycondensation can also be carried out in the presence of a coloration inhibitor in order to prevent coloration due to heat deterioration in the polycondensation step. The coloration inhibitors which can be used are preferably phosphorus compounds such as phosphoric acid, triphenyl phosphate, pyrophosphoric acid, phosphorous acid and triphenyl phosphite. The amount is preferably 0.01–5% by weight, more preferably 0.5–2% by weight for the polymer. The amount less than 0.01% by weight decreases the effect for inhibiting coloration. The amount exceeding 5% by weight does not additionally improve coloration and inhibits molecular weight increase.

EXAMPLE

The present invention will hereinafter be illustrated by way of examples. The present invention is not constructed to be limited by the method and equipment shown below.

The molecular weight of polymer described in the specification was measured with Shodex GPC system-11 (manufactured by Showa Denko Co.) by using a chloroform solvent at a column temperature of 40° C. The value of molecular weight was converted to polystyrene. The value of YI was obtained by preparing a press sheet specimen having a thickness of 2 mm and measuring with a color computer (manufactured by Suga Testing Instrument Co.)

The adsorption equilibrium of lactic acid and lactide to drying agents was measured as follows.

Drying agents used were molecular sieve 3A (MS) and strongly acidic cation exchage resin S100 (IER, manufactured by Bayer) having a sulfonic acid group as an exchanger and a sodium ion as a counter ion.

To 100 g of o-dichlorobenzene (ODCB) having a prescribed concentration of lactic acid or lactide (LTD), 5 g of the drying agent is added, stirred for 3 hours at the prescribed temperature. At the point of time, concentration of the solute in ODCB is measured. Amount of desorption is calculated on the basis of the difference from charged concentration.

Example 1

To a 500 ml four necked flask equipped with a thermometer, stirrer, condenser and outlet tube, 104.2 g of 90% L-lactic acid was charged and heated at 140° C. with stirring for 3 hours while removing water out of the reaction system. Successively the outlet tube was dismantled, a Dean Stark trap was mounted as a substitution, and further 0.38 g of Sn powder and 75 g of o-dichlorobenzene were added and heat refluxed at 140° C./200–250 mmHg for 8 hours.

During the step, a refluxed mixture of o-dichlorobenzene and generated water was separated in the Dean Stark trap and the lower layer, o-dichlorobenzene alone was always returned to the reaction system while inhibiting return of water drop to the system. Successively, the Dean Stark trap was dismantled and a tube packed with 50 g of ion exchange resin: Levatit S100 (manufactured by Bayer AG) was mounted on the flask so as to return the distilled solvent to the reaction system after passing through the ion exchange resin layer. The reaction was carried out at 140° C./200–250 mmHg for 10 hours and successively at 110° C./80–90 mmHg for 10 hours. After finishing the reaction, 400 ml of chloroform was added to the reaction mass and the reaction mass was dissolved and suction filtered to remove tin powder. A chloroform solution thus obtained was mixed with 1400 ml of methanol and the precipitate was filtered and dried.

Polylactic acid thus obtained was 71.4 g, a white solid. The yield was 95.2%. The product had a weight average molecular weight of 163,000 and a YI value of 1.8 on a press sheet.

Example 2

The tube packed with the ion exchange resin and used in Example 1 was dismantled from the reaction flask. The ion exchange resin was dried and regenerated by downwardly passing nitrogen gas though the ion exchange resin layer at a rate of 5 l/hr at 120° C. for 3 hours. By using the same equipment and procedures as Example 1, 104.2 g of 90% L-lactic acid was subjected to dehydration condensation. Successively, a tube packed with 50 g of regenerated ion exchange resin was mounted on the reaction flask and the reaction was carried out at 140° C./200–250 mmHg for 10 hours and at 110° C./80–90 mmHg for 10 hours while dehydrating and refluxing the solvent. After finishing reaction, similar post treatment gave 72.0 g of polylactic acid powder. Yield was 96.0%. Weight average molecular weight was 165,000. YI value of the press sheet was 1.8.

Examples 3–15

Repeated use of regenerated ion exchange resin was carried out by the same procedures as above.

The yield, weight average molecular weight, and YI value of press sheet are shown in Table 1.

Comparative Example 1

To a 500 ml four necked flask equipped with a thermometer, stirrer, condenser and outlet tube, 104.2 g of 90% L-lactic acid was charged and heated at 140° C. with stirring for 3 hours while removing water out of the reaction system. Successively the outlet tube was dismantled, a Dean Stark trap was mounted as a substitution, and further 0.38 g of Sn powder and 75 g of o-dichlorobenzene were added and heat refluxed at 140° C./200–250 mmHg for 8 hours.

During the step, a refluxed mixture of o-dichlorobenzene and generated water was separated in the Dean Stark trap and the lower layer, o-dichlorobenzene, alone was always returned to the reaction system while inhibiting return of water drop to the system. Successively, the Dean Stark trap was dismantled and a tube packed with 50 g of molecular sieve 3A was mounted on the flask so as to return the distilled solvent to the reaction system after passing through the molecular sieve layer. The reaction was carried out at 140° C./200–250 mmHg for 10 hours and successively at 110° C./80–90 mmHg for 10 hours. After finishing the reaction, 400 ml of chloroform was added to the reaction mass and the reaction mass was dissolved and suction filtered to remove tin powder. A chloroform solution thus obtained was mixed with 1400 ml of methanol and the precipitate was filtered and dried.

Polylactic acid thus obtained was 71.1 g, white solid. The yield was 94.8%. The product had a weight average molecular weight of 158,000 and a YI value of 1.9 on a press sheet.

Comparative Example 2

The tube packed with molecular sieve and used in Comparative Example 1 was dismantled from the reaction flask. Molecular sieve was dried and regenerated by downwardly passing nitrogen gas through the molecular sieve layer at a rate of 5 l/hr at 250° C. for 2 hour. By using the same equipment and procedures as Comparative Example 1, 104.2 g of 90% L-lactic acid was subjected to dehydration condensation. Successively, a tube packed with 50 g of regenerated molecular sieve was mounted on the reaction flask and the reaction was carried out at 140° C./200–250 mmHg for 10 hours and at 110° C./80–90 mmHg for 10 hours while dehydrating and reluxing the solvent. After finishing reaction, similar post treatment gave 70.6 g of polylactic acid powder. Yield was 94.1%. Weight average molecular weight was 155,000. YI value of the press sheet was 2.3.

Comparative Example 3–15

Repeated use of regenerated molecular sieve was carried out by the same procedures as above.

The yield, weight average molecular weight, and YI value of press sheet are shown in Table 1.

Products having good color tone could be steadily obtained in the case of using regenerated in exchange resin compared with the case of using regenerated molecular sieve.

TABLE 1

| Example | Driving agent Regeneration (number) | Yield (%) | Mw × 10⁻⁴ | YI value |
|---|---|---|---|---|
| 1 |  | 95.2 | 16.3 | 1.8 |
| 2 | 1 | 96.0 | 16.5 | 1.8 |
| 3 | 2 | 95.5 | 16.4 | 1.7 |
| 4 | 3 | 95.7 | 15.9 | 1.8 |
| 5 | 4 | 95.5 | 16.0 | 1.9 |
| 6 | 5 | 95.3 | 16.1 | 1.8 |
| 7 | 6 | 94.4 | 16.3 | 1.9 |
| 8 | 7 | 95.0 | 16.3 | 1.8 |
| 9 | 8 | 95.9 | 16.0 | 1.8 |
| 10 | 9 | 95.4 | 15.8 | 1.7 |

TABLE 1-continued

| Example | Driving agent Regeneration (number) | Yield (%) | Mw × 10⁻⁴ | YI value |
|---|---|---|---|---|
| 11 | 10 | 95.3 | 15.8 | 1.8 |
| 12 | 11 | 95.0 | 16.0 | 1.8 |
| 13 | 12 | 95.4 | 16.6 | 1.9 |
| 14 | 13 | 96.0 | 16.5 | 1.8 |
| 15 | 14 | 95.8 | 16.3 | 1.8 |
| Comp. 1 |  | 94.8 | 15.8 | 1.9 |
| Comp. 2 | 1 | 94.1 | 15.5 | 2.3 |
| Comp. 3 | 2 | 95.0 | 15.2 | 2.7 |
| Comp. 4 | 3 | 95.2 | 15.1 | 3.0 |
| Comp. 5 | 4 | 94.9 | 15.2 | 3.3 |
| Comp. 6 | 5 | 95.0 | 14.8 | 3.4 |
| Comp. 7 | 6 | 94.9 | 14.7 | 3.8 |
| Comp. 8 | 7 | 94.3 | 14.6 | 4.2 |
| Comp. 9 | 8 | 94.4 | 15.1 | 4.7 |
| Comp. 10 | 9 | 94.3 | 15.0 | 5.4 |
| Comp. 11 | 10 | 94.3 | 15.2 | 5.7 |
| Comp. 12 | 11 | 94.5 | 14.8 | 5.9 |
| Comp. 13 | 12 | 94.2 | 14.3 | 6.5 |
| Comp. 14 | 13 | 95.2 | 14.2 | 6.9 |
| Comp. 15 | 14 | 95.0 | 14.4 | 7.1 |

Example 16

To a 500 ml four necked flask equipped with a thermometer, stirrer, condenser and outlet tube, 58.8 g of succinic acid, 44.9 g of 1,4-butanediol and 0.86 g of tin powder were charged and heated with stirring at 140° C. for 3 hours while removing water out of the reaction system. Successively, the outlet tube was dismantled and a tube packed with 50 g of ion exchange resin; Levatit S100 (manufactured by Bayer AG) was mounted as substitution so as to return the reflux-distilled solvent to the reaction system after passing through the ion exchange resin layer. After adding 285 g of o-dichlorobenzene, the reaction mixture was heat-refluxed at 110° C./90 mmHg. After reacting for 20 hour the reaction mass was mixed with 400 ml of chloroform, dissolved, and suction filtered to remove tin powder. The filtrate was mixed with 1400 ml of methanol and precipitated white solid was filtered and dried. Polybutylene succinate thus obtained was 82.9 g. The yield was 96.7%. The weight average molecular weight was 133,000. The press sheet was pure white.

Example 17

The ion exchange resin which was used in Example 16 was regenerated by applying the same procedures as Example 2. Polybutylene succinate was prepared by using the regenerated ion exchange resin thus obtained and carrying out the same procedures as Example 16. The product obtained was 83.3 g. The yield was 97.2%. The weight average molecular weight was 130,000. The press sheet was pure white.

Example 18–20

The ion exchange resin was regenerated after finishing the reaction and repeatedly used for the next example. The yield, weight average molecular weight, and color tone of the press sheet of the resulting polybutylene succinate are illustrated in Table 2.

Comparative Example 16

Polybutylene succinate was prepared by carrying out the same procedures as described in Example 16 except that molecular sieve was used for the drying agent. Polybutylene succinate thus obtained was 83.0 g. The yield was 96.8%. The weight average molecular weight was 129,000. The press sheet was pure white.

Comparative Example 17

The molecular sieve which was used in Comparative Example 16 was regenerated by applying the same procedures as Comparative Example 2. Polybutylene succinate was prepared by using the regenerated molecular sieve thus obtained and carrying out the same procedures as Comparative Example 16. The product obtained was 81.9 g. The yield was 95.6%. The weight average molecular weight was 131,000. The press sheet was white.

Comparative Examples 18–20

The molecular sieve was regenerated after finishing the reaction and repeatedly used for the next comparative example. The yield, weight average molecular weight, and color tone of the press sheet of the resulting polybutylene succinate are illustrated in Table 2.

TABLE 2

| Example | Driving agent Regeneration (number) | Yield (%) | Mw × 10⁻⁴ | Color tone |
|---|---|---|---|---|
| 16 |  | 96.7 | 13.3 | pure white |
| 17 | 1 | 97.2 | 13.0 | pure white |
| 18 | 2 | 97.5 | 13.4 | pure white |
| 19 | 3 | 97.7 | 13.9 | pure white |
| 20 | 4 | 96.8 | 13.0 | pure white |
| Comp. 16 |  | 96.8 | 12.9 | pure white |
| Comp. 17 | 1 | 95.6 | 13.1 | white |
| Comp. 18 | 2 | 96.5 | 12.4 | white |
| Comp. 19 | 3 | 95.7 | 13.0 | light brownish white |
| Comp. 20 | 4 | 96.0 | 12.7 | light brownish white |

Example 21

To a 500 ml four necked flask equipped with a thermometer, stirrer, condenser and a tube which was packed with 50 g of an ion exchange resin: Levatit S100 (manufactured by Bayer AG), 17.2 g of a butylene succinate polymer having a weight average molecular weight of 12,000, 64.9 g of a lactic acid polymer having a weight average molecular weight of 16,000, 250 g of o-dichlorobenzene and 0.45 g of tin oxide were charged and heat-refluxed at 110° C./90 mm. The solvent distilled out of the reaction system was returned to the system after passing through the ion exchange resin layer.

After reacting for 30 hours, 400 ml of chloroform was added, and dissolved the reaction mass. The resulting solution was suction filtered to remove tin powder. The filtrate thus obtained was mixed with 1400 ml of methanol. The resulting precipitate was filtered and dried to obtain 80.1 g of a polylactic acid/polybutylene succinate copolymer as a white solid. The yield was 97.6%. The weight average molecular weight was 132,000. The YI value of the press sheet was 2.0.

Example 22

The ion exchange resin which was used in Example 21 was regenerated by applying the same procedures as Example 2. A polylactic acid/polybutylene succinate copolymer was prepared by using the regenerated ion exchange resin thus obtained and carrying out the same procedures as Example 21. The copolymer obtained was 79.4 g. The yield was 96.8%. The weight average molecular weight was 132,000. The press sheet had a YI value of 1.9.

Examples 23–25

The ion exchange resin was regenerated after finishing the reaction and repeatedly used for the next example.

The yield, weight average molecular weight, and YI value of the press sheet of the resulting polylactic acid/polybutylene succinate copolymer are illustrated in Table 3.

Comparative Example 21

A polylactic acid/polybutylene succinate copolymer was prepared by carrying out the same procedures as described in Example 21 except that molecular sieve was used as a drying agent. The copolymer thus obtained was 79.1 g. The yield was 96.4%. The weight average molecular weight 134,000. The press sheet had a YI value of 2.0.

Comparative Example 22

The molecular sieve which was used in Comparative Example 21 was regenerated by applying the same procedures as Comparative Example 2. A polylactic acid/polybutylene succinate copolymer was prepared by using the regenerated molecular sieve thus obtained and carrying out the same procedures as Example 21. The copolymer obtained was 78.8 g. The yield was 96.0%. The weight average molecular weight was 122,000. The press sheet had a YI value of 2.5.

Comparative Examples 23–25

The molecular sieve was regenerated after finishing the reaction and repeatedly used for the next comparative example.

The yield, weight average molecular weight, and YI value of the press sheet of the resulting polylactic acid/polybutylene succinate copolymer are illustrated in Table 3.

TABLE 3

| Example | Driving agent Regeneration (number) | Yield (%) | Mw × 10⁻⁴ | YI value |
|---|---|---|---|---|
| 21 |  | 97.6 | 13.2 | 2.0 |
| 22 | 1 | 96.8 | 13.2 | 1.9 |
| 23 | 2 | 96.7 | 13.4 | 1.9 |
| 24 | 3 | 96.7 | 13.1 | 2.0 |
| 25 | 4 | 96.6 | 13.1 | 2.0 |
| Comp. 21 |  | 96.4 | 13.4 | 2.0 |
| Comp. 22 | 1 | 96.2 | 12.2 | 2.5 |
| Comp. 23 | 2 | 95.5 | 12.3 | 2.9 |
| Comp. 24 | 3 | 95.7 | 12.7 | 3.2 |
| Comp. 25 | 4 | 96.8 | 12.2 | 3.5 |

What is claimed is:

1. In a process for preparing aliphatic polyester from one or more aliphatic compound (A) selected from the group consisting of;
   (a1) an aliphatic hydroxycarboxylic acid,
   (a2) a polymer of an aliphatic hydroxycarboxylic acid,
   (a3) an aliphatic polycarboxylic acid and an aliphatic polyhydric alcohol, and
   (a4) a polymer of an aliphatic polycarboxylic acid and aliphatic polyhydric alcohol,
   by heating in an organic solvent in the presence of a catalyst, distilling a generated water containing organic solvent out of the reaction system, treating the distilled organic solvent with a drying agent, and returning the treated solvent to the reaction system to progress a dehydration polycondensation reaction,
   a preparation process of aliphatic polyester, comprising using an ion exchange resin as a drying agent and after the dehydration polycondensation reaction, regenerating and drying the used ion exchange resin and repeatedly using said ion exchange resin in the next dehydration polycondensation reaction.

2. The preparation process of aliphatic polyester according to claim 1, wherein the ion exchange resin used is a strongly acidic ion exchange resin containing an exchanger of sulfonic acid group with a sodium ion as a counter ion.

3. The preparation process of aliphatic polyester according to claim 1, wherein the aliphatic compound (A) is (a1) an aliphatic hydroxycarboxylic acid and/or (a2) a polymer of an aliphatic hydroxycarboxylic acid.

4. The preparation process of aliphatic polyester according to claim 2, wherein the aliphatic compound (A) is (a1) an aliphatic hydroxycarboxylic acid and/or (a2) a polymer of an aliphatic hydroxycarboxylic acid.

5. The preparation process of aliphatic polyester according to claim 3, wherein the aliphatic hydroxycarboxylic acid is lactic acid.

6. The preparation process of aliphatic polyester according to claim 4, wherein the aliphatic hydroxycarboxylic acid is lactic acid.

7. The preparation process of aliphatic polyester according to claim 1, wherein the aliphatic compound (A) is (a3) an aliphatic polycarboxylic acid and aliphatic polyhydric alcohol and/or (a4) a polymer of an aliphatic polycarboxylic acid and an aliphatic polyhydric alcohol.

8. The preparation process of aliphatic polyester according to claim 2, wherein the aliphatic compound (A) is (a3) an aliphatic polycarboxylic acid and aliphatic polyhydric alcohol and/or (a4) a polymer of an aliphatic polycarboxylic acid and an aliphatic polyhydric alcohol.

9. The preparation process of aliphatic polyester according to claim 7, wherein the aliphatic polycarboxylic acid is succinic acid and the aliphatic polyhydric alcohol is 1,4-butanediol.

10. The preparation process of aliphatic polyester according to claim 8, wherein the aliphatic polycarboxylic acid is succinic acid and the aliphatic polyhydric alcohol is 1,4-butanediol.

11. The preparation process of aliphatic polyester according to claim 1, wherein the aliphatic compound (A) is a mixture of (a1) an aliphatic hydroxycarboxylic acid and (a3) an aliphatic polycarboxylic acid and an aliphatic polyhydric alcohol.

12. The preparation process of aliphatic polyester according to claim 2, wherein the aliphatic compound (A) is a mixture of (a1) an aliphatic hydroxycarboxylic acid and (a3) an aliphatic polycarboxylic acid and an aliphatic polyhydric alcohol.

13. The preparation process of aliphatic polyester according to claim 11, wherein the aliphatic hydroxycarboxylic acid is lactic acid, the aliphatic polycarboxylic acid is succinic acid and the aliphatic polyhydric alcohol is 1,4-butanediol.

14. The preparation process of aliphatic polyester according to claim 12, wherein the aliphatic hydroxycarboxylic acid is lactic acid, the aliphatic polycarboxylic acid is succinic acid and the aliphatic polyhydric alcohol is 1,4-butanediol.

15. The preparation process of aliphatic polyester according to claim 1, wherein the aliphatic compound (A) is a mixture of (a2) a polymer of an aliphatic hydroxycarboxylic acid and (a4) a polymer of an aliphatic polycarboxylic acid and an aliphatic polyhydric alcohol.

16. The preparation process of aliphatic polyester according to claim 2, wherein the aliphatic compound (A) is a mixture of (a2) a polymer of an aliphatic hydroxycarboxylic acid and (a4) a polymer of an aliphatic polycarboxylic acid and an aliphatic polyhydric alcohol.

17. The preparation process of aliphatic polyester according to claim 15, wherein the aliphatic hydroxycarboxylic acid is lactic acid, the aliphatic polycarboxylic acid is succinic acid and the aliphatic polyhydric alcohol is 1,4-butanediol.

18. The preparation process of aliphatic polyester according to claim 16, wherein the aliphatic hydroxycarboxylic acid is lactic acid, the aliphatic polycarboxylic acid is succinic acid and the aliphatic polyhydric alcohol is 1,4-butanediol.

* * * * *